US011086066B2

(12) United States Patent
Min et al.

(10) Patent No.: US 11,086,066 B2
(45) Date of Patent: Aug. 10, 2021

(54) INTEGRATED OPTICAL SHEET MODULE AND BACKLIGHT UNIT HAVING SAME

(71) Applicant: LMS Co., Ltd, Pyeongtaek-si (KR)

(72) Inventors: Jee Hong Min, Seongnam-si (KR); Se Jin Oh, Gyeonggi-do (KR); Dong Cheol Lee, Osan-si (KR); Woo Jong Lee, Osan-si (KR); Jin Yeon Choi, Anyang-si (KR); Min Ho Kim, Seoul (KR); Du Yi Kim, Hwaseong-si (KR)

(73) Assignee: LMS CO., LTD, Pyeongtaek-si (KR)

( * ) Notice: Subject to any disclaimer, the term of this patent is extended or adjusted under 35 U.S.C. 154(b) by 0 days.

(21) Appl. No.: 16/649,110

(22) PCT Filed: Sep. 18, 2018

(86) PCT No.: PCT/KR2018/010945
§ 371 (c)(1),
(2) Date: Mar. 19, 2020

(87) PCT Pub. No.: WO2019/059605
PCT Pub. Date: Mar. 28, 2019

(65) Prior Publication Data
US 2020/0292747 A1    Sep. 17, 2020

(30) Foreign Application Priority Data

Sep. 20, 2017  (KR) .................. 10-2017-0120999

(51) Int. Cl.
*F21V 8/00*    (2006.01)

(52) U.S. Cl.
CPC .......... *G02B 6/0051* (2013.01); *G02B 6/0053* (2013.01); *G02B 6/0056* (2013.01)

(58) Field of Classification Search
CPC .. G02B 6/0051; G02B 6/0053; G02B 6/0056; G02F 1/1335
See application file for complete search history.

(56) References Cited

U.S. PATENT DOCUMENTS

| | | | | |
|---|---|---|---|---|
| 5,844,720 A | * | 12/1998 | Ohara | .......... F21V 5/02 359/599 |
| 2010/0165241 A1 | * | 7/2010 | Kim | .......... G02B 6/0053 349/61 |

(Continued)

FOREIGN PATENT DOCUMENTS

| CN | 101957462 A | 1/2011 |
|---|---|---|
| CN | 102109712 A | 6/2011 |

(Continued)

OTHER PUBLICATIONS

International Search Report from International Application No. PCT/KR2018/010945 dated Mar. 11, 2019 in 3 pages.

(Continued)

*Primary Examiner* — Donald L Raleigh
(74) *Attorney, Agent, or Firm* — Polsinelli PC

(57) ABSTRACT

The present invention provides an integrated optical sheet module where an optical sheet is integrally formed without a diffusion sheet, a condensing sheet and a reflective polarizing sheet thereby reducing the overall thickness and improving the viewing angle, so that a manufacturing process can be simplified and significantly improve the left to right viewing angle while minimizing the brightness drop by forming the first base film having the viewing angle improvement component on the bottom surface with a haze characteristic.

13 Claims, 7 Drawing Sheets

(56) References Cited

U.S. PATENT DOCUMENTS

| | | | |
|---|---|---|---|
| 2011/0096566 A1* | 4/2011 | Tsai | G02B 6/0036 |
| | | | 362/607 |
| 2011/0157518 A1 | 6/2011 | Ham | |
| 2015/0301265 A1 | 10/2015 | Min et al. | |
| 2016/0259115 A1 | 9/2016 | Kitano et al. | |

FOREIGN PATENT DOCUMENTS

| | | | | | |
|---|---|---|---|---|---|
| CN | 104412132 A | | 3/2015 | | |
| CN | 105745558 A | | 7/2016 | | |
| EP | 2530515 A2 | | 12/2012 | | |
| JP | 2009-157405 A | | 7/2009 | | |
| JP | 2009157405 A | * | 7/2009 | ............... | G02B 5/04 |
| JP | 2012-252340 A | | 12/2012 | | |
| JP | 2012252340 A | * | 12/2012 | ........... | G02B 6/0053 |
| KR | 10-2006-0077515 A | | 7/2006 | | |
| KR | 20120077071 A | * | 7/2012 | ............. | G02B 30/25 |
| KR | 10-2014-0006211 A | | 1/2014 | | |
| KR | 20140006211 A | * | 1/2014 | ....... | G02F 1/133504 |
| KR | 10-1407440 B1 | | 6/2014 | | |
| KR | 101407440 B1 | * | 6/2014 | ........ | G02F 1/13357 |
| KR | 10-1555839 B1 | | 9/2015 | | |

OTHER PUBLICATIONS

Chinese Office Action dated Apr. 23, 2021 issued in corresponding Patent Application No. 201880060195.5 w/English Translation (14 pages).

Search document issued in corresponding Patent Application No. 201880060195.5 (3 pages).

* cited by examiner

INTEGRATED OPTICAL SHEET MODULE AND BACKLIGHT UNIT HAVING SAME

CROSS-REFERENCE TO RELATED APPLICATION(S)

This application is a National Phase Entry of PCT International Application No. PCT/KR2018/010945, which was filed on Sep. 18, 2018, and claims priority to Korean Patent Application No. 10-2017-0120999, which was filed on Sep. 20, 2017, the contents of which are incorporated herein by reference.

BACKGROUND

1. Field

The present invention is related to an integrated optical sheet module and it is related to the integrated optical sheet module maintaining the brightness without having a separate diffusion sheet and a reflective polarizing sheet and capable of improving a viewing angle and a backlight unit having this.

2. Description of the Related Art

In recent years, usage of a flat display panel is expanded and as its representative, there is a liquid crystal display device.

In general, the liquid crystal display device (LCD) needs a backlight unit to provide a uniform light throughout the entire display screen unlike a conventional cathode ray tube system (CRT).

The backlight unit turns light into a surface light source by having a lamp which is a linear light source and a light guide unit which reflects the light from the lamp. At this time, the light source is disposed adjacent to the side of the light guide unit and transmits the light which has penetrated into the light guiding unit and then the light is diffused and condensed by the optical sheet module.

Here, the optical sheet module includes a diffusion sheet for diffusing light, one or more condensing sheets condensing the diffused light in one direction and a reflective polarizing sheet for increasing the brightness.

The conventional optical sheet module was used as a surface light source by stacking a plurality of layers.

Since a recently developed display panel becomes thinner, the thickness of the backlight module itself is required to be made thinner.

Referring to Korean Patent Publication 2011-0076373, the invention was configured to diffuse light transmitted from a lower part by a condensing sheet having a separate bead formed but without a separate diffusion sheet.

However, in this case, there is a problem of having non-uniform brightness because it is simply difficult to diffuse the light sufficiently only with the bead included in the condensing sheet.

In other words, when the diffusion sheet is removed simply to reduce the thickness of the optical sheet module, the brightness is not uniform, resulting in a problem that the viewing angle becomes narrow due to insufficient reliability and insufficient diffusion.

Consequently, it is necessary to develop a structure which can sufficiently supplement the brightness and the view angle while thinning the backlight unit simultaneously.

SUMMARY

As a task for the present invention to solve the problem as stated above, the present invention provides an integrated optical sheet module where an optical sheet is integrally formed without a diffusion sheet, a condensing sheet and a reflective polarizing sheet thereby reducing the overall thickness and improving the viewing angle.

For the integrated optical sheet module wherein a light source is disposed to a side of the integrated optical sheet module, the present invention to solve the problem as stated above is configured to comprise a first base film composed of optically transparent material and formed to have a consistent thickness; a first light condensing component wherein a first light condensing unit where its cross-sectional area decreases toward the upper portion of the top surface of the first base film is formed in a first extension direction and is sequentially and repeatedly arranged; a second base film composed of optically transparent material, stacked on the top of the first light condensing component and formed to have a consistent thickness; a second light condensing component wherein a second light condensing unit where its cross-sectional area decreases toward the upper portion of the top surface of the second base film is formed in a second extension direction which is different from the first extension direction and is sequentially and repeatedly arranged; and a viewing angle improvement component wherein a unit formed on the bottom surface of the first base film being protruded is formed in a third extension direction which is different from the first extension direction and is sequentially and repeatedly arranged thereby improving a left to right viewing angle through a total reflection.

In addition, it is characterized that the first extension direction and the second extension direction are perpendicular to each other.

In addition, it is characterized that the first extension direction and the third extension direction are perpendicular to each other.

In addition, it is characterized that the unit is formed in a structure where its cross-sectional area decreases toward the bottom portion.

In addition, it is characterized that the third extension direction is perpendicular to a direction where the light is emitted from the light source.

In addition, it is characterized that the unit includes a light incident surface disposed in the direction of the light emitted from the light source and a light facing surface where its bottom end portion is connected to the light incident surface and formed with an upward inclination to reflect the light upwards.

In addition, it is characterized that at least one of the light incident surface or the light facing surface is formed to be connected wherein the cross-sectional trajectory along the vertical direction has a plurality of different inclination angles.

Further, it is characterized that the light facing surface is formed to be protruded to the outside direction with the reference to a virtual straight line trajectory (V) led from the most bottom portion to the most upper portion of the unit.

In addition, it is characterized that at least one of the light incident surface or the light facing surface is formed wherein its cross-sectional trajectory along the vertical direction is a curved shape.

In addition, the first base film may include a plurality of beads.

In addition, it is characterized that the beads are composed of at least one of Alumina, TiO2, Melamine, Silica, PMMA, PBMA, and PDMS.

In addition, it is characterized that the beads are formed to have a diameter of 1~9 µm size.

In addition, it is characterized that the second base film is configured to selectively transmit or reflect light by stacking a plurality of layers having different refractive indices.

In addition, it is characterized that the second base film is configured to be integrally adhered to the first light condensing component.

In addition, it is characterized that the second base film and the first light condensing component is adhered by an adhesion layer.

A backlight unit according to another aspect of the present invention for solving the problem stated above comprises the integrated optical sheet module.

According to the present invention solving the problem stated above, there are following effects.

First, it has the advantage of simplifying a manufacturing process because the conventional diffusion sheet, the light condensing sheet, and the reflective polarizing sheet are not provided separately but are integrally formed thereby reducing the overall thickness of the backlight unit.

Second, there is an effect to significantly improve the left to right viewing angle while minimizing the brightness drop by forming the first base film having the viewing angle improvement component on the bottom surface with a haze characteristic.

The effects of the present invention are not limited to the above-mentioned effects, and other effects not mentioned will be clearly understood by those skilled in the art from the description of the claims.

DETAILED DESCRIPTION

Below, preferred embodiments of the present invention which can be practiced with the specific object of the present invention are explained with referring to accompanying drawings. As the present embodiments are described, the same names and numbers are used with respect to the same features and additional description will be omitted accordingly.

The integrated optical sheet module in accordance with the embodiments of the present invention will be explained as being adapted for a backlight unit of a LCD or a LED panel as an example. But, the present invention shall not be limited to this, and the integrated optical sheet module can be applied for standalone use, for a backlight which is applied for another device than the liquid crystal display device or for a device which can change an optical property and path of a lighting device.

First, referring to FIGS. 1 to 5, the configuration of a backlight unit according to the present invention is as follows.

Figure 1:
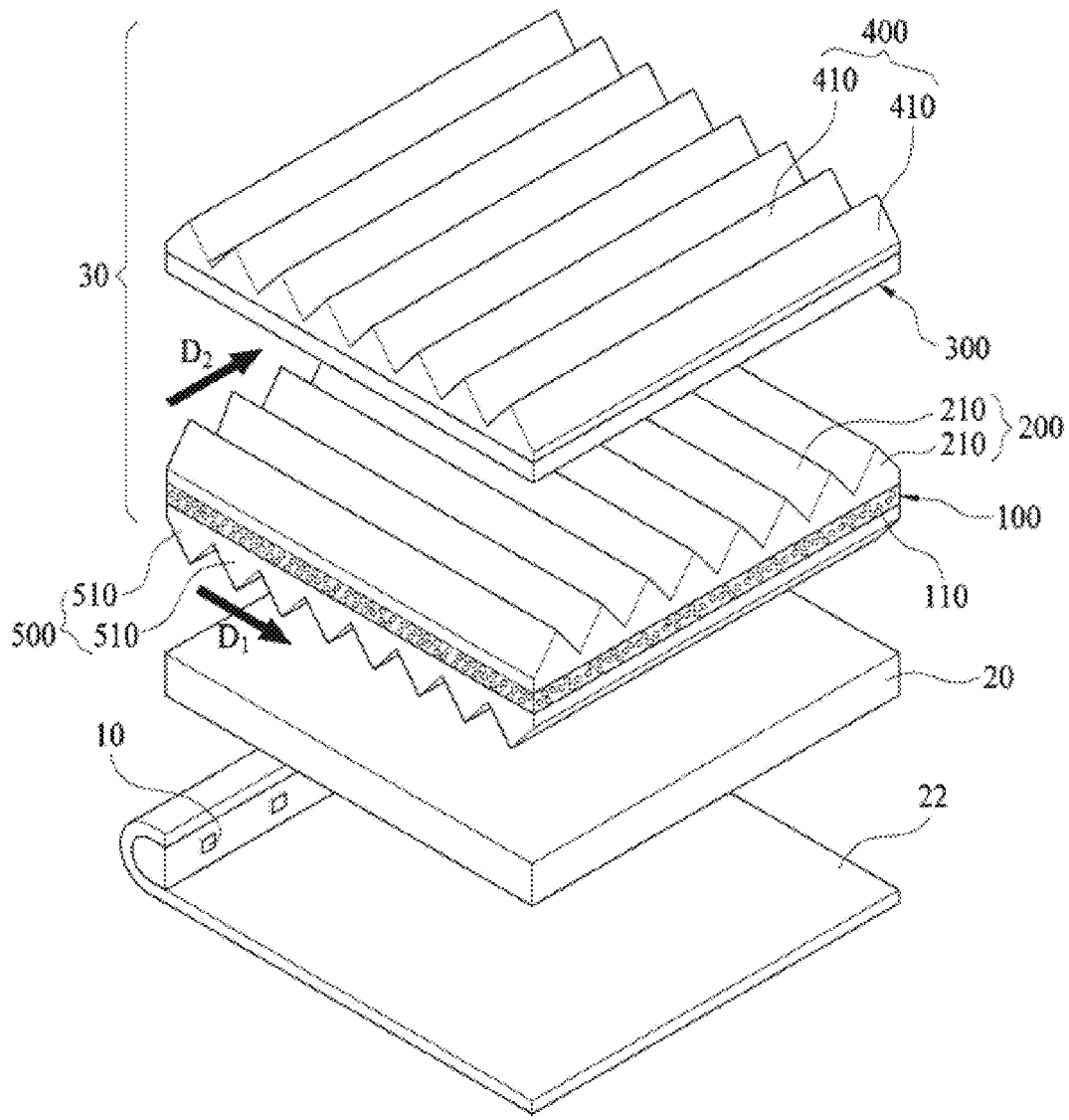
FIG. 1 is a schematic diagram disclosing a configuration of a backlight unit comprising an integrated optical sheet module according to an embodiment of the present invention.
Figure 2:
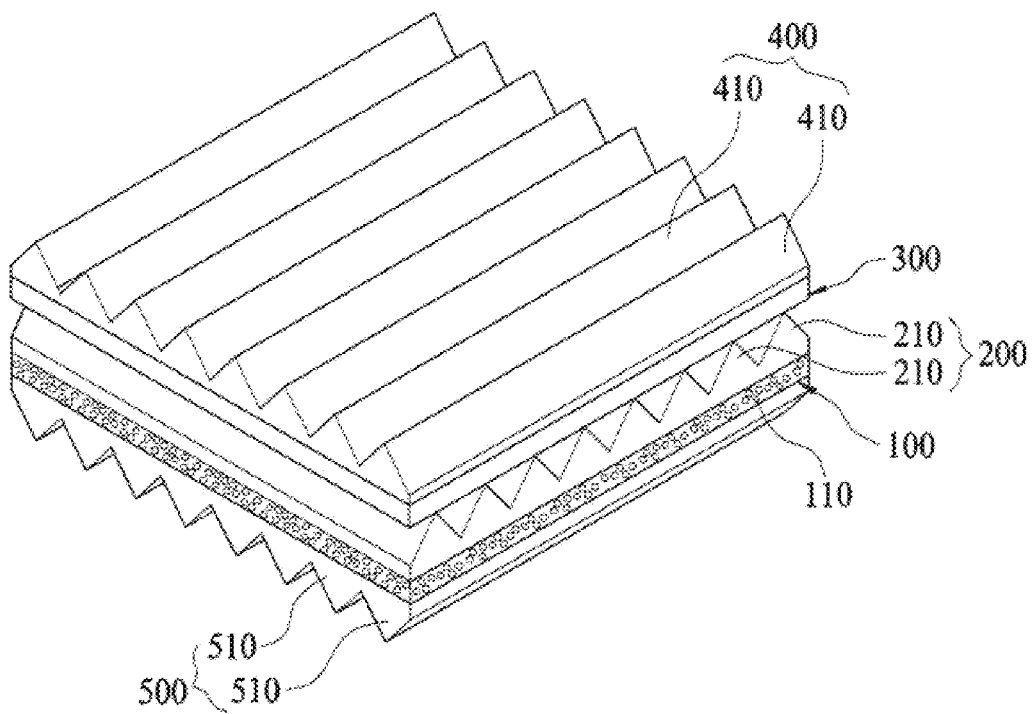
FIG. 2 is a schematic diagram disclosing a configuration of the integrated optical sheet module in FIG. 1.
Figure 3:
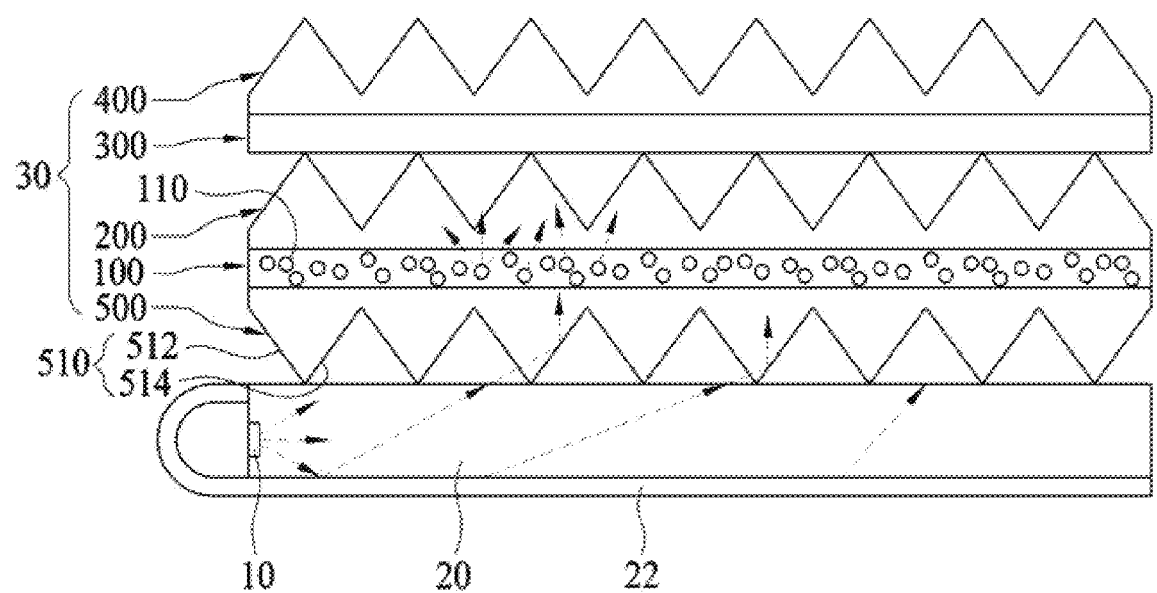
FIG. 3 is a diagram disclosing a condition of incident light diffusion for the integrated optical sheet module in FIG. 1.

FIG. 1 is a schematic diagram disclosing the configuration of the backlight unit comprising an integrated optical sheet module according to an embodiment of the present invention, FIG. 2 is a schematic diagram disclosing the configuration of the integrated optical sheet module in FIG. 1 and FIG. 3 is a diagram disclosing a condition of incident light diffusion for the integrated optical sheet module in FIG. 1.

Figure 4:
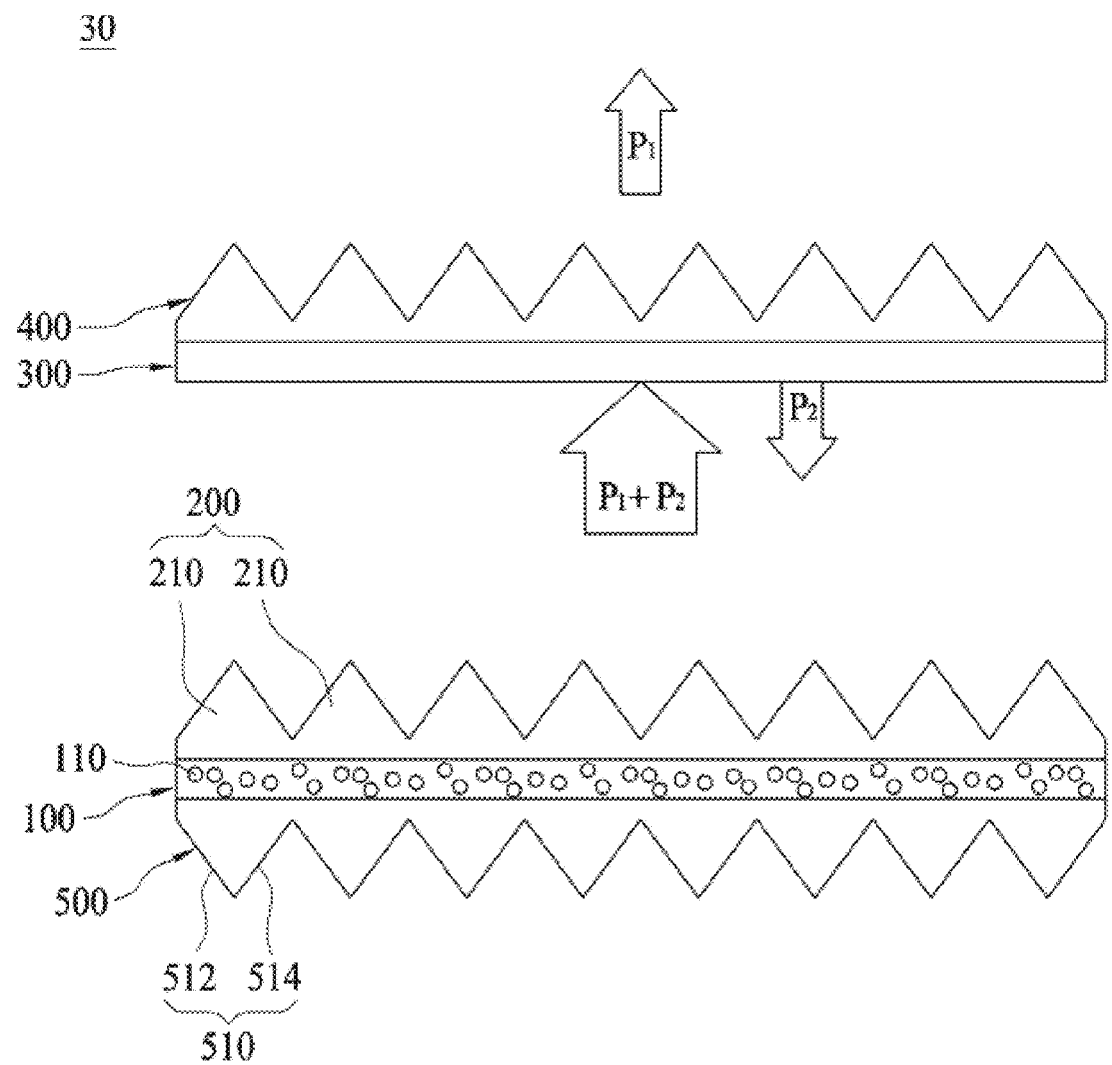
FIG. 4 is a diagram disclosing a condition where a certain portion of light is transmitted or reflected by a first base film for the integrated optical sheet module in FIG. 1.
Figure 5:
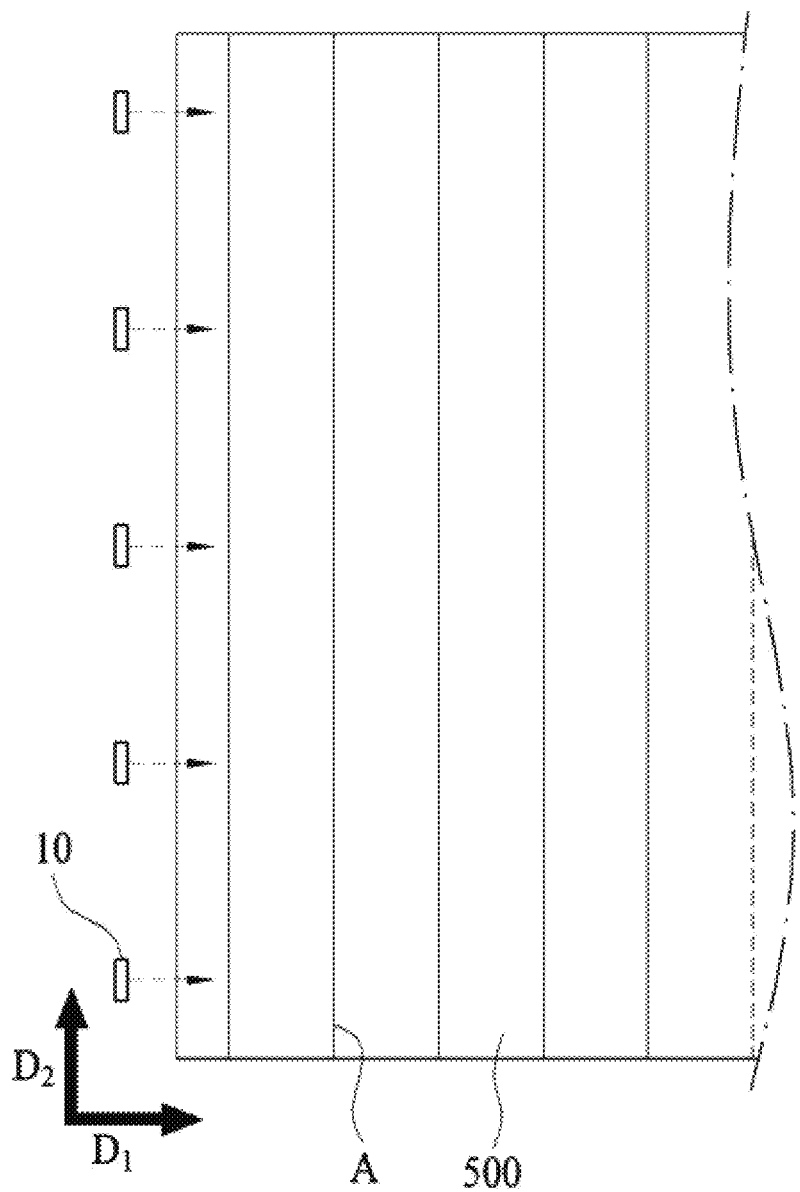
FIG. 5 is a diagram disclosing a situation where an extension direction of a viewing angle improvement component and light emitted from a light source is perpendicularly arranged for the integrated optical sheet module in FIG. 1.

FIG. 4 is a diagram disclosing a condition where a certain portion of light is transmitted or reflected by a first base film for the integrated optical sheet module in FIG. 1 and FIG. 5 is a diagram disclosing a situation where an extension direction of a viewing angle improvement component and light emitted from a light source is perpendicularly arranged for the integrated optical sheet module in FIG. 1.

In general, for configuring a liquid crystal display device, a backlight unit (BLU: Back Light Unit) is necessary to be provided for a light source providing light to the liquid crystal display device.

The backlight unit according to the present invention includes a light source (10), a light guide unit (20) and an optical sheet module (30).

Typically, the light source (10) generates the light at the side of the light guide unit (20) to minimize the volume of the backlight unit and transmits the light to the light guide unit (20). As for the light source (10), a light emitting diode (LED) and a cold cathode fluorescent lamp (CCFL) may be selectively used.

Specifically, the light source (10) is composed of at least one or more of those and emits the light toward the side of the light guide unit (20).

The light guide unit (20) has a pre-determined thickness, is formed of a flat-plate shape and transmits the light incident through the side to the top portion.

Specifically, the light incident to the light guide unit (20) causes the total reflection at the inside, traverses and then emits to the top portion. In this case, the light guide unit allows the light incident from the light source to traverse along the plate and transmits to the top portion by modifying as a surface light source (10).

In addition, the light guiding unit (20) may be provided with a reflecting plate (22) at the bottom portion and it is configured for the reflecting plate (22) to reflect the light, which has passed through the light guide unit (20) and then transmitted to the bottom portion to, the top portion.

On the other hand, the optical sheet module (30) is stacked on the top portion of the light guide unit (20) and it transmits the light as the surface light source (10) by diffusing and condensing the light transmitted from the bottom portion.

Specifically, the optical sheet module (30) is composed of a plurality of stacked sheets and is formed as a single body, and transmits the light transmitted from the bottom to the top.

The optical sheet module (30) according to the present invention comprises largely a first base film (100), a first light condensing component (200), a second base film (300), a second light condensing component (400) and a viewing angle improvement component (500).

The first base film (100) is composed of an optical transparent material having a pre-determined thickness and is formed as a flat-plate shape. In addition, the viewing angle improvement component (500) and the first light condensing component (200) which will be described later are supported to be formed on the top and bottom surfaces, respectively.

Specifically, the first base film (100) has a uniform thickness and transmits the light from the bottom to the top. In this case, as shown, the first base film (100) may have a separate viewing angle improvement component (500) formed at the bottom portion and transmit the light transmitted from the light guide unit (20) by the viewing angle improvement component (500) to the top portion.

On the other hand, the first base film (100) in the present invention can be configured to have a haze characteristic thereby diffusing light transmitted from the bottom portion. The haze characteristic is a characteristic that when light passes through a transparent material, it diffuses according to the intrinsic properties of the material depending on the kind of material other than the reflection and the absorption.

Thus, the first base film (100) is configured to include a light-diffusing component such as a bead (110) wherein the light transmitted from the bottom portion is diffused. At this time, the bead (110) is formed in the shape of granules and has a uniform or non-uniform size and is dispersed and disposed in the first base film (100).

More specifically, the beads (110) may preferably be consisted of at least one of Alumina, TiO2, Melamine, Silica, PMMA, PBMA, and PDMS and are preferably in a spherical shape. And, the refractive index of the bead (110) is preferably 1.5.

Here, the bead (110) may use a scatter particle having a diameter of 1~9 μm size and may scatter the light transmitted from the bottom portion.

And, the first base film (100) as configured above diffuses the light transmitted from the bottom portion and then transmits to the first light condensing component (200) as described later.

In this case, although FIG. 3 of the present embodiment does not correspond with the drawings of FIG. 1 and FIG. 2, this is done to schematically illustrate in a simplified manner so that the structure of the present invention may be easily understood.

Meanwhile, the first light condensing component (200) has a first light condensing unit (210) of which cross-sectional area decreases toward the upper portion of the top surface of the first base film (100) being formed in a first extension direction and being sequentially and repeatedly arranged.

Specifically, the first light condensing component (200) is configured to condense the light transmitted through the first base film (100) and then to transmit to the upper portion, thereby the first light condensing unit (210) is formed.

Here, the first light condensing unit (210) has an inclination surface and the cross-sectional area is formed to decrease toward the upper portion thereby condensing the light through the inclination surface.

In the present embodiment, the first light condensing unit (210) has a pair of the inclination surfaces, has a cross-section along a vertical direction in a triangular shape and is formed as a prism shape.

Here, the first light condensing unit (210) may be formed as a plurality of protrusions shape, on the contrary, each of the first light condensing unit (210), as shown in this embodiment, may be formed on the top surface of the first base film (100) with the extension of an elongated belt shape.

In other words, the first light condensing component (200) includes a plurality of the first light condensing units (210) and it condenses the light through these.

In this case, the first light condensing unit (210) is formed along the top surface of the first base film (100) in the first extension direction. Referring to the drawings, the first extension direction is a first direction (D1). In this case, the direction repeatedly arranged means a second direction (D2).

In addition, the first direction (D1) is a direction in which the light is emitted from the light source (10), and the second direction (D2) is a direction orthogonal to the first direction (D1).

Thus, the first light condensing component (200) is provided on the top surface of the first base film (100) and it condenses the light transmitted through a plurality of the first light condensing units (210) to the bottom portion and then transmits to the top portion.

In addition, the first light condensing unit (210) may be configured in plural and may have the same size and shape, or alternatively, it may be configured to have different sizes and inclination angles of the inclination surface.

In other words, depending on the application, the first light condensing unit (210) is formed unevenly to condense the light to the upper portion, and by being unevenly formed, it can prevent the additional occurrence of moire, etc.

The second base film (300) is composed of an optically transparent material, similarly to the first base film (100) as described above, is arranged in stacked form on the upper portion of the first light condensing component (200), and transmits the light from the bottom portion to the upper portion.

Specifically, the second base film (300) has a uniform thickness in a sheet formation and is stacked on the upper portion of the first light condensing component (200) and the condensed light is firstly transmitted by the first light condensing component (200) and then transmitted to the second light condensing component (400) which will be described later.

In the present embodiment, the second base film (300) has a pre-determined thickness and is stacked on the first light condensing component (200), and supports a second light condensing component (400) which will be described later.

On the other hand, the second base film (300) is composed of a single layer and thereby it may be configured to transmit light, or alternatively, a plurality of layers having different a refractive index from each other is stacked and thereby it may be configured to selectively transmit or reflect the light.

As shown in FIG. 4, in a case where the second base film (300) is configured for a plurality of layers having a different refractive index from each other is stacked, it has a reflective polarization characteristic and thereby the light with only a particular polarization is transmitted and the light not transmitted can be reflected to the bottom portion.

Here, the second base film (300) composed of a multilayer layer stacked can function as a reflective polarizer reflecting the particular polarization light or as a mirror.

In addition, it may be configured to be a wavelength selective reflection mirror such as a "cold mirror" where it reflects visible light and transmits infrared light or a "hot mirror" where it transmits the visible light and reflects the infrared light.

The second base film (300) according to the present invention is configured for several tens, hundreds or thousands of layers of films having different high refractive indexes and low refractive indexes from each other to be stacked.

Thus, in the present invention configured as such, as shown in FIG. 4, the light transmitted from the bottom portion to the second base film (300) is in a state where the light having different polarizations is mixed and thereby it is configured to have a light of P1 having polarization in the region where the second base film (300) transmits and a light of P2 having polarization in the region where the second base film (300) does not transmit.

In this case, the light transmitting through the first base film (100) and the first light condensing component (200) is in a mixed state of the P1 and P2, but the second base film (300) transmits only the light of P1 and reflects the light of P2 to the bottom portion again.

Thus, the light of P1 transmitted through the second base film (300) is emitted to the outside, but the light of P2 light is reflected and returns to the bottom portion and then it reflected again by the light guide unit (20), the first base film (100) and the first light condensing component (200) and moved to the upper portion again. Through this process, the light of P2 changes its polarization state and thereby its polarization state is changed to the light of P1 which can be transmitted through the second base film (300) by such repeating.

Finally, since the second base film (300) according to the present invention has a reflective polarization characteristic, the light transmitted to the upper portion can be transmitted with the uniform polarization state.

Of course, alternatively the second base film (300) is configured to have simply a single layer composed of the optically transparent material without the reflective polarization characteristic.

On the other hand, the second base film (300) is stacked on the first light condensing component (200), but it can be configured to be integrally laminated.

For this purpose, the upper end portion of the first light condensing component (200) performs as an adhesive and thereby it may be integrally formed.

Specifically, when the second base film (300) is stacked on the upper portion of the first light condensing component (200), the first light condensing component (200) is formed be a semi-cured state and the first light condensing component (200) is completely cured in a state where the second base film (300) is stacked on the upper portion.

Thus, it can be integrally formed being with cured where the upper end portion of the first light condensing component (200) contacts with the bottom surface of the second base film (300).

In addition, alternatively, an additional adhesive layer (not disclosed) can be formed between the second base film (300) and the first light condensing component (200) and it can be configured to be integrally formed where the first light condensing component (200) and the second base film (300) are adhered by the adhesive layer.

On the other hand, the second light condensing component (400) is provided on the upper surface of the second base film (300) thereby condensing the light transmitted from the bottom portion. Specifically, the second light condensing component (400) is similar to that of the first light condensing component (200) and has a second light condensing unit (410) where its cross-sectional area decreases toward the upper portion of the top surface of the second base film is formed in a second extension direction which is different from the first extension direction and is sequentially and repeatedly arranged.

Here, the second extension direction where the second light condensing unit (410) is formed represents a second direction (D2) as shown in the drawing and the direction repeatedly arranged means a first direction (D1).

In addition, the second light condensing unit (410) has a pair of inclination surfaces as same as the first light condensing unit (210) and has a cross-section along a vertical direction in a triangular shape thereby condensing the light through the inclination surfaces.

In the present embodiment, for the second light condensing unit (410) having a cross-sectional area that decreases toward the upper surface of the second base film (300) as similarly to the first light condensing unit (210), the second light condensing unit (410) is provided on the second base film (300) by being formed along the second direction (D2) which is the second extension direction.

In other words, it can be confirmed that the first direction (D1) where the above-described first light condensing unit (210) is formed and the second direction (D2) where the second light condensing unit (410) is formed are perpendicular to each other and since they are formed be orthogonal to each other, they can uniformly condense the light transmitted from the bottom portion.

Here, the second light condensing component unit (410) is composed of plural units, and each of which may have the same size and shape or be configured to have a different size and inclination angle for the inclination surface as with the above-described the first light condensing unit (210).

Thus, the second light condensing portion (400) has a plurality of the second light condensing units (410) which are formed on the upper surface of the second base film (300) and condenses the light transmitted through the second base film (300) for the second time and transmits to the upper portion.

Next, the viewing angle improvement component (500) is formed on the bottom surface of the first base film (100) and it transmits light from the light source (10) to the upper portion by reflection.

Specifically, the viewing angle improvement component (500) includes a unit portion (510) protruding downward to the bottom surface of the first base film (100), formed to a third extension direction different from the first extension direction, sequentially repeatedly arranged, and reflecting the light.

In addition, a plurality of the units (510) is formed to have a cross-sectional area decreasing from the bottom surface of the first base film (100) to the bottom portion thereby reflecting the light.

In this case, a plurality of the units (510) may have a uniform size and shape, or may be configured to have a different size and shape different from each other.

In the present embodiment, the unit (510) is formed similarly to the first light condensing unit (210) and includes a light incident surface (512) where the light is incident and a light facing surface (514) where its bottom end portion is connected to the light incident surface (512) to form a upward slope.

And, the light incident surface (512) and the light facing surface (514) transmit the light incident by the internal total reflection to the upper portion when the light transmitted from the light source (10) or the light guide unit (20) is incident.

In this case, the light incident surface (512) and the light facing surface (514) may be formed in a straight line of cross-sectional trajectory along the vertical direction, or may be formed in various forms such as a curved shape or a double angle.

The unit (510) according to the present embodiment as showing in the drawing is formed where the light incident surface (512) and the light facing surface (514) are formed along the bottom surface of the first base film (100).

Here, the unit (510) is formed along the bottom surface of the first base film (100) to a third extension direction and referring to the drawing, the third extension direction represents the second direction (D2) and the direction repeatedly arranged means a first direction (D1).

In other words, the unit (510) is formed along the same second direction (D2) as the second light condensing unit (410) and is arranged repeatedly along the first direction (D1).

In addition, the third extension direction which is the direction of the unit (510) is preferably arranged to face the light emitted from the light source (10).

More specifically, referring to FIG. 5 disclosing the extension direction of the unit (510) and the light emitted from the light source (10), 'A' is a point protruded to the bottom portion while the light incident surface (512) and the light facing surface (514) of the unit (510) meet and it can be confirmed that the forming direction of 'A' is formed along the second direction (D2).

Here, as illustrated, since the forming direction of 'A' where a point protruded to the bottom portion while the light incident surface (512) and the light facing surface (514) of the unit (510) meet is arranged to face the light source (10) thereby reflecting the light, the reflecting efficiency of the light can be increased.

Moreover, if the second direction (D2) which is the arrangement direction of 'A' and the first direction (D1) where the light is emitted from the light source (10) is arranged to be orthogonal, the efficiency of light reflection at the unit (510) can be maximized.

In addition, alternatively, the arrangement direction of 'A' is may not be perpendicular to the first direction (D1) but simply can be arranged to be just crossing and such can be applied for the appropriate usage by changing the angle of intersection according to the design.

The unit (510) in present embodiment is arranged to be orthogonal to the first direction (D1) and is configured to be substantially the same as the third extension direction and the second direction (D2).

Thus, the unit (510) is formed extending along the same direction as the second direction (D2) and is arranged to intersect with the traveling direction of the light emitted from the light source (10) in opposing form.

In addition, the unit (510) is formed as a reverse-prism shape as illustrated thereby reflecting the light emitted from the light source (10) to the upper portion and then transmitting the light.

In this case, since the light incident surface (512) of the unit (510) and the light facing surface (514) are faced to the light source (10), the light emitted from the light source (10) is reflected with a state where the left to right viewing angle is improved.

In other words, the unit (510) is arranged to be perpendicular between the second direction (D2) which is the third extension direction and the first direction (D1) which is the traveling direction of the light emitted from the light source (10) and thereby it is possible to significantly improve the left to right viewing angle.

Of course, although the third extension direction shows the same direction as the second direction (D2) in this embodiment, alternatively, the third extension direction may be arranged to the direction where it simply intersects but is not perpendicular to the first direction (D1) and the third extension direction may be formed in a direction different from the second direction (D2).

As described above, since in the optical sheet module (30) according to the present invention, the left to right viewing angle is improved by the viewing angle improvement component (500) and the up and down viewing angle may also be improved by the bead (110) later, it is possible to transmit the light to the upper portion where the overall viewing angle is improved with minimized brightness deterioration.

On the other hand, although not shown in the drawing, the unit (510) includes the beads inside such as in the first base film (100) and they may increase the light diffusion efficiency.

In addition, a plurality of patterns may be formed on a surface of at least one of the light incident surface (512) or the light facing surface (514) to further diffuse the light.

As such, since the viewing angle improvement component (500) is comprised of the unit (510), it reflects the transmitted light and at the same time diffuses light with the first base film (100) and then transmits it to the upper portion.

The optical sheet module (30) according to the present invention includes the first base film (100), the first light condensing component (200), the second base film (300), the second light condensing component (400) and the viewing angle improvement component (500) which are integrally formed through the mutual lamination bonding.

In addition, the optical sheet module (30) configured as described above diffuses and condenses the light transmitted from the light source (10) and the light guide unit (20) and transmits the light to the upper portion.

In this case, as described above, the unit (510) and the second light condensing unit (410) are formed to extend in the second direction (D2) and the first light condensing unit (210) is formed to extend in the first direction (D1) so that the light transmitted from the bottom portion can be evenly transmitted to the upper portion.

Thus, by integrally configuring the optical sheet module (30) as such, there is not only a relatively simple structure compared to the multilayer structure of a conventional diffusion sheet, a condensing sheet, and a reflective polarizing sheet but also there is the further effect of viewing angle improvement. The effectiveness of this will be described later.

Next, referring to FIG. 6 and FIG. 7, if the modified shape of the unit (510) for the optical sheet module (30) according to the invention is observed, it is as follows.

Figure 6:
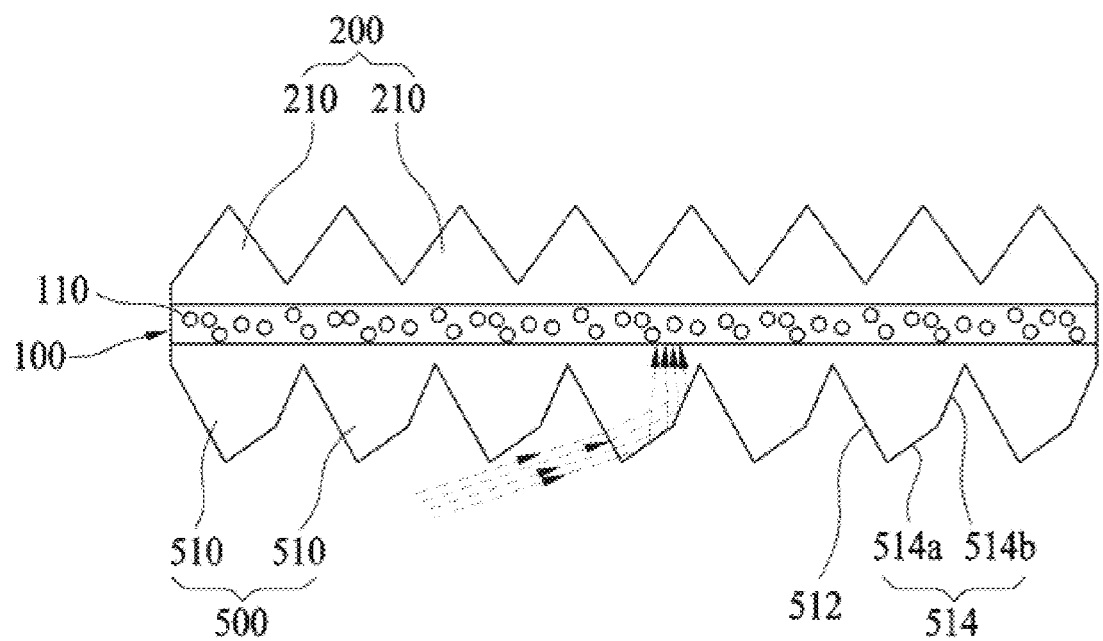
FIG. 6 is a diagram disclosing a double angle shape at the viewing angle improvement component for the integrated optical sheet module in FIG. 1.
Figure 7:
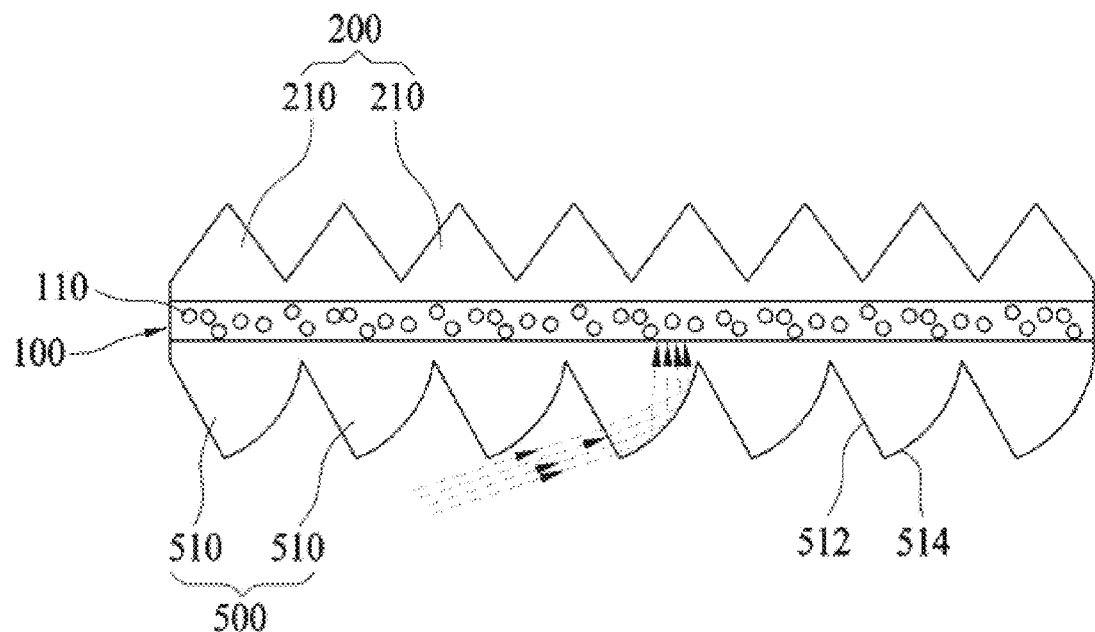
FIG. 7 is a diagram disclosing a light facing surface of the viewing angle improvement component being a curved shape for the integrated optical sheet module in FIG. 1.

FIG. 6 is a diagram showing the viewing angle improvement component (500) having a double angle shape for the integrated optical sheet of FIG. 1 and FIG. 7 is a diagram showing the light facing surface (514) of the viewing angle improvement component (500) having a curved shape for the integrated optical sheet of FIG. 1.

First, referring to FIG. 6, the basic configuration is similar to that described above, but the viewing angle improvement component (500) is formed in a prism shape having a double angle.

Specifically, at least one of the light incident surface (512) or the light facing surface (514) is formed to have the cross-sectional trajectory along the vertical direction with a plurality of different inclination angles and to be connected.

And, the light is reflected by the light incident surface (512) and the light facing surface (514) formed as such and is transmitted to the upper portion. In this case, the viewing angle improvement component (500) has the light incident surface (512) and the light facing surface (514) as described above and it is formed to have a slope in a different direction and to meet the bottom end portion.

In the present embodiment, the light facing surface (514) is formed have the cross-sectional trajectory along the vertical direction with a plurality of different inclination angles and to be connected.

Here, the light facing surface (514) is formed to be protruded to the outside direction with the reference to a virtual straight line trajectory (V) where the cross-sectional trajectory along the vertical direction is led from the most bottom portion to the most upper portion.

The cross-sectional trajectory along the vertical direction for the light facing surface (514) can be formed in a shape where straight lines having different slopes from each other are continuously connected and it is constructed to reflect the light incident from the light incident surface (512) to the upper direction.

In addition, alternatively, the cross-sectional trajectory along the vertical direction for the light facing surface (514) may be formed in a curved shape.

In the present embodiment, the light facing surface (514) is configured to include the first surface (514*a*) and the second surface (514*b*) as shown.

The most bottom portion of the first surface (514*a*) is abutted to the light incident surface (512) and has an upward slope. And, as shown in FIG. 6, the first surface (514*a*) reflects the incident light coming through the incident surface (512) to the upper direction and then transmits to the upper portion.

On the other hand, the second surface (514*b*) is continuously extended from the first face (514*a*) to the upper portion and is also formed to have the upward slope with different angle for the first surface (514*a*).

In other words, the second surface (514*b*) is continuously formed on the upper portion of the first surface (514*a*) and it forms the light facing surface (514) together with the first surface (514*a*).

Here, as shown, the cross-sectional trajectory along the vertical direction of the first surface (514*a*) and the second surface (514*b*) is formed in a straight line. Alternatively, the cross section trajectory along the vertical direction may be formed in a curved line.

The second surface (514*b*) formed as such transmits the light coming through the light incident surface (512) to the upper portion and transmits the light to the upper portion with different light direction transmitted from the first surface (514*a*).

Thus, the modified form of the viewing angle improvement component (500) in the present invention reflects the light through the light facing surface (514) to various directions and then transmits to the upper portion.

In the present embodiment, although the light facing surface (514) is composed of two surfaces which are the first surface (514*a*) and the second surface (514*b*), alternatively, it may be constructed to have various plural surfaces or to have a curved surface thereby evenly reflecting the light. In addition, depending on the purpose of use, the light facing surface (514) may be formed to have a structure that is recessed inside without protruding to the outside.

Then, referring to FIG. 7, when another modified form of the unit (510) is observed, the shape of the unit (510) is different in the above-mentioned viewing angle improvement component (500).

Specifically, the cross-sectional trajectory along the vertical direction of at least one of the light incident surface (512) or the light facing surface (514) in the unit (510) is formed as a curved shape and reflects the light.

In the present embodiment, unlike the case shown in FIG. 6, the light facing surface (514) is configured to have a curved shape vertical cross-sectional trajectory instead of a double angle or a single angle shape.

Since the light facing surface (514) is constructed to reflect the incident light from the light source (10) and transmit to the upper portion, it is formed to have the curved shape vertical cross-sectional trajectory to disperse the incident light at various angles thereby unevenly reflecting the light.

Here, the light facing surface (514) has the vertical cross-sectional trajectory to have a curvature of a uniform shape, but alternatively, it may be configured to have a non-uniform curvature.

In addition, the light incident surface (512) as well as the light facing surface (514) may be formed to have the vertical cross-sectional trajectory of a double angle shape or a curved shape.

Once again, the light facing surface (514) may also be formed with a structure protruding to the outside as well as being recessed inside depending on the purpose of use.

By forming the viewing angle improvement component (500) as such, it stably reflects the light transmitted from the light source (10) or the light guide unit (20) and then transmits to the upper portion.

Next, referring to FIGS. 8 and 9, if the optical sheet module (30) according to the invention and the conventional optical sheet is observed for comparison, it is as follows.

Figures 8A, 8B:
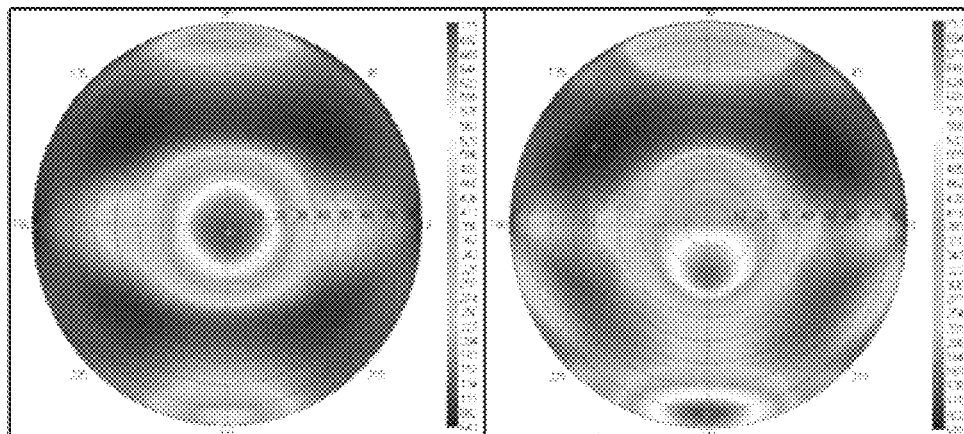
FIGS. 8A to 8B consist of a diagram disclosing a state where the viewing angle is improved by comparing with a conventional optical sheet module and the integrated optical sheet module in FIG. 1.
Figure 9:
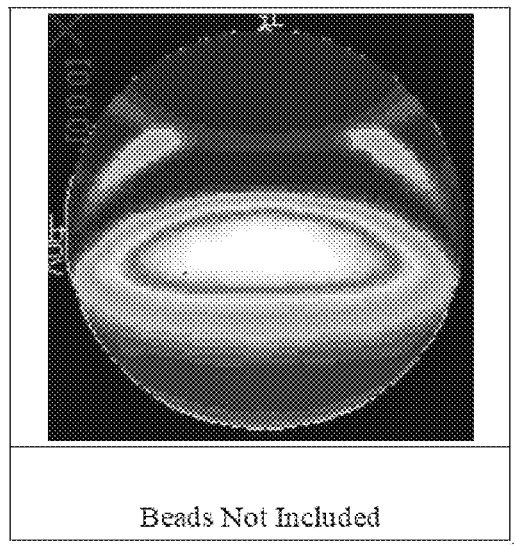
FIG. 9 is a diagram disclosing a viewing angle measured in the condition where only the viewing angle improvement component is placed on the bottom portion of the first base film for the integrated optical sheet module in FIG. 1.

FIGS. 8A to 8B consist of a diagram disclosing a state where the viewing angle is improved by comparing with the conventional optical sheet module and the integrated optical sheet module in FIG. 1 and FIG. 9 is a diagram disclosing a viewing angle measured in the condition where only the viewing angle improvement component (500) is placed on the bottom portion of the first base film (100) for the integrated optical sheet module in FIG. 1.

Here, FIG. 8A is related to a conventional stacked type optical sheet consisting of three layers of a diffusion sheet, a light condensing sheet and a reflective polarizing sheet.

And, FIG. 8B is the optical sheet module (30) according to the present invention and it is configured to integrally comprise the first base film (100), the first light condensing component (200), the second base film (300), the second light condensing component (400) and the viewing angle improvement component (500).

As a result of measuring the viewing angle and the brightness with respect to each of them, it can be seen that the viewing angle of the optical sheet module (30) according to the present invention was increased with the reference to FIG. 8A. Of course, despite there being a slight decrease in brightness, the difference is within 4%, and it can be seen that the viewing angle with respect to the left to right direction was significantly improved.

More specifically, the light emitted from the light source (10) is transmitted to the upper portion through the light guide unit and the viewing angle with respect to the left to right direction for the light emitted from the light guide unit is improved by the characteristic of the viewing angle improvement component (500) formed on the bottom surface of the first base film (100).

In addition, the viewing angle with respect to the up and down direction for the light passing through the viewing angle improvement component (500) is also improved by the beads (110) included in the first base film (100).

In more detail, as shown in FIG. 9, when only the viewing angle improvement component (500) is provided on the bottom surface of the first base film (100), the light transmitted from the light source (10) or the light guide part (20) is reflected by the viewing angle improvement component (500) thereby it can be seen that only the the left to right viewing angle is significantly improved.

Here, in the case of FIG. 9, it can be seen that only the left to right viewing angle was improved but the up and down viewing angle was in a narrow state because the light is reflected by the viewing angle improvement component (500) without having the bead (110) in the first base film (100).

However, as shown in FIG. 8B, it can be seen that the viewing angle along the vertical direction of the light transmitted to the upper portion was also improved because the light reflected and transmitted by the viewing angle improvement component (500) was diffused by the beads (110) since the beads (110) were included in the first base film (100).

In other words, since the optical sheet module (30) according to the present invention transmits the light through the viewing angle improvement component (500) to the upper portion at the same time improves the viewing angle with respect to the left to right direction, and modifies the insufficient up and down viewing angle through the beads (110) included in the first base film (100), it can be seen that it derives similar brightness to the conventional optical sheet module as well as rather significantly improving the left to right directional viewing angle even without having the diffusion sheet and the reflective polarization sheet.

Thus, the optical sheet module (30) according to the present invention has an effect to derive similar brightness to the conventional one with a relatively thin thickness as well as to improve the left to right directional viewing angle at the same time even without having the diffusion sheet and the reflective polarization sheet.

In this way, the optical sheet module in accordance with the present invention can diffuse and condense the light transmitted from the bottom portion only with two layers as well as improve the viewing angle unlike the conventional one.

As described above, the preferred embodiments and the modified examples according to the present invention were reviewed and it is obvious to those who have ordinary skill in the art that the present invention can be implemented in particular ways without falling outside the scope of the invention even though not described in the embodiments above. Therefore, described embodiments are considered not as limitations but as examples and the present invention can be modified within the scope of accompanying claims or their equivalents without limiting to the description stated above.

What is claimed is:

1. An integrated optical sheet module wherein a light source is disposed to a side of the integrated optical sheet module comprising,
    a first base film composed of optically transparent material and formed to have a consistent thickness;
    a first light condensing component wherein a first light condensing unit where its cross-sectional area decreases moving away from the upper portion of the top surface of the first base film is formed in a first extension direction and is sequentially and repeatedly arranged;
    a second base film composed of optically transparent material, stacked on the top of the first light condensing component and formed to have a consistent thickness;
    a second light condensing component wherein a second light condensing unit where its cross-sectional area decreases moving away from the upper portion of the top surface of the second base film is formed in a second extension direction which is different from the first extension direction and is sequentially and repeatedly arranged; and
    a viewing angle improvement component wherein a unit formed on the bottom surface of the first base film being protruded is formed in a third extension direction which is different from the first extension direction and is sequentially and repeatedly arranged thereby improving a left to right viewing angle through a total reflection,
    wherein the first base film comprises a plurality of beads having a haze characteristic, wherein the first base film diffuses light passing through the viewing angle improvement component and transmits the light to the upper portion of the first base film, and
    wherein the first extension direction is perpendicular to the second extension direction, and the third extension direction is the same as the second extension direction.

2. The integrated optical sheet module of claim 1, wherein the second base film is configured to selectively transmit or reflect a light by stacking a plurality of layers having different refractive indices.

3. A backlight unit comprising the integrated optical sheet module of claim 1.

4. The integrated optical sheet module of claim 1, wherein the unit of the viewing angle improvement component is formed in a structure where its cross-sectional area decreases toward the bottom portion.

5. The integrated optical sheet module of claim 4, wherein the third extension direction is perpendicular to a direction where the light is emitted from the light source.

6. The integrated optical sheet module of claim 1, wherein the unit of the viewing angle improvement component includes a light incident surface disposed in the direction of the light emitted from the light source; and
    a light facing surface where its bottom end portion is connected to the light incident surface and formed with an upward inclination to reflect the light upwards.

7. The integrated optical sheet module of claim 6, wherein at least one of the light incident surface or the light facing surface is formed to be connected wherein a cross-sectional trajectory along a vertical direction has a plurality of different inclination angles.

8. The integrated optical sheet module of claim 7, wherein the light facing surface is formed to be protruded to the outside direction with a reference to a virtual straight line trajectory (V) led from the most bottom portion to the most upper portion of the unit.

9. The integrated optical sheet module of claim 7, wherein at least one of the light incident surface or the light facing surface is formed wherein the cross-sectional trajectory along the vertical direction is a curved shape.

10. The integrated optical sheet module of claim 1, wherein the beads are composed of at least one of Alumina, TiO2, Melamine, Silica, PMMA, PBMA, and PDMS.

11. The integrated optical sheet module of claim 1, wherein the beads are formed to have a diameter of 1·9 µm.

12. The integrated optical sheet module of claim 1, wherein the second base film is configured to be integrally adhered to the first light condensing component.

13. The integrated optical sheet module of claim 12, wherein the second base film and the first light condensing component is adhered by an adhesion layer.

* * * * *